United States Patent [19]
Barr, Jr. et al.

[11] 4,201,950
[45] May 6, 1980

[54] LOW DEACTIVATION CHEMICAL LASER

[75] Inventors: Thomas A. Barr, Jr., Huntsville; Miles E. Holloman, Decatur; Joseph M. Walters, Harvest, all of Ala.

[73] Assignee: The United States of America as represented by the Secretary of the Army, Washington, D.C.

[21] Appl. No.: 875,053

[22] Filed: Feb. 3, 1978

[51] Int. Cl.² ............................................. H01S 3/095
[52] U.S. Cl. .................................................. 331/94.5 G
[58] Field of Search .................... 331/94.5 G, 94.5 P, 331/94.5 D, 94.5 T; 330/4.3

[56] References Cited

U.S. PATENT DOCUMENTS

| | | | |
|---|---|---|---|
| 3,688,215 | 8/1972 | Spencer et al. | 331 94.5 G/ |
| 3,863,176 | 1/1975 | Martinez et al. | 331/94.5 P |

OTHER PUBLICATIONS

Gross et al., *Handbook of Chemical Lasers*, copyright 1976 by John Wiley and Sons Inc., Printed in U.S.A. pp. 243-261.

Primary Examiner—James W. Davie
Attorney, Agent, or Firm—Nathan Edelberg; Robert P. Gibson; James T. Deaton

[57] ABSTRACT

A hydrogen fluoride/deuterium fluoride chemical laser having low concentration of deactivants is provided by the application of external heat rather than by internal combustion to cause thermal decomposition of the normal diatomic fluorine to convert it to atomic fluorine. This is accomplished by external heating of inert gases that then heat the diatomic fluorine or by directly heating from an external source the diatomic fluorine to form atomic fluorine. The formed atomic fluorine is then mixed with hydrogen and/or deuterium in a laser chamber to produce lasing of the gases when brought together in a conventional manner and therefrom a laser output.

7 Claims, 3 Drawing Figures

U.S. Patent  May, 6, 1980  4,201,950

LOW DEACTIVATION CHEMICAL LASER

DEDICATORY CLAUSE

The invention described herein may be manufactured, used, and licensed by or for the Government for governmental purposes without the payment to us of any royalties thereon.

BACKGROUND OF THE INVENTION

The present state of the art uses normal diatomic fluorine, or nitrogen trifluoride and some kind of fuel such as hydrogen, ethylene, acetylene, or other fuel to produce the atomic fluorine. In these prior art devices, the fuel is burned with an excess of fluorine or nitrogen trifluoride so that in addition to combustion products a certain amount of atomic fluorine will be produced. In this process, such products as hydrogen or deuterium fluoride and fluorides of carbon are produced. These other products are universally deleterious in that they eventually deactivate vibrationally excited laser gas. That is, the mixture resulting from the combustion products usually include atomic fluorine, diatomic fluorine, hydrogen or deuterium fluoride and fluorocarbons that are expended through nozzles and mixed with hydrogen or deuterium as the case may be in a lasing chamber. This results in a reaction of hydrogen or deuterium with the atomic fluorine to generate vibrationally excited hydrogen fluoride or deuterium fluoride. These compounds of hydrogen fluoride or deuterium fluoride, being in a vibrational population partial inversion, are the source of the laser power. The presence of the other molecules from the combustion products causes deactivation of the vibrational states of the hydrogen fluoride or deuterium fluoride and a lessening of the available laser energy.

Therefore, it is an object of this invention to provide a method and apparatus whereby the amount of deactivating molecules in a hydrogen fluoride or deuterium fluoride laser can be reduced to an insignificant amount.

Another object of this invention is to provide a hydrogen fluoride or deuterium fluoride laser in which a correspondingly increase in laser power output can can be realized by a reduction of the deactivants introduced with the atomic fluorine into the laser chamber.

A further object of this invention is to provide atomic fluorine by the application of externally applied heat to diatomic fluorine to convert it to atomic fluorine.

A still further object of this invention is to apply heat to inert gases that in turn transfer the heat therefrom to diatomic fluorine or a fluorine compound to convert the fluorine to atomic fluorine.

Other objects and advantages of this invention will be obvious to those skilled in this art.

SUMMARY OF THE INVENTION

In accordance with this invention, various arrangements are provided for causing thermal decomposition of the normal diatomic fluorine to produce atomic fluorine by the application of external heat rather than by an internal combustion of the gas that is used to cause decomposition of diatomic fluorine to atomic fluorine. This is accomplished by introducing fluorine or nitrogen trifluoride with or without an inert gas such as helium and/or nitrogen and heating the gases externally such as in a furnace to cause the diatomic fluorine gas to be converted to atomic fluorine when properly heated and then the mixing of the atomic fluorine with hydrogen and/or deuterium in a lasing cavity or chamber to produce a laser output. It is to be understood that in the case of nitrogen trifluoride, probably atomic fluorine is disassociated from the nitrogen trifluoride as sufficient heat is applied. In one embodiment, the fluorine and/or nitrogen trifluoride is mixed with the inert gas and heated in a furnace for later mixing with the deuterium and/or hydrogen. In another embodiment, the inert gases of helium and/or nitrogen are heated in the furnace and then mixed with fluorine and/or nitrogen trifluoride to convert the diatomic fluorine to atomic fluorine before it is mixed with deuterium and/or hydrogen to produce a laser output. The heat source for the furnace can either be a hydrocarbon air type furnace, electrical means or some other equivalent external heat source. When the fluorine and inert gases are heated together in the furnace, the furnace is lined with a ceramic liner due to the corrosive action of the fluorine.

DESCRIPTION OF THE PREFERRED EMBODIMENTS

In accordance with this invention, thermal decomposition of normal diatomic fluorine and/or nitrogen trifluoride to atomic fluorine is produced by a method of applying external heat to a structure through which an inert gas or the diatomic fluorine is passed to heat the fluorine to a temperature sufficient to produce atomic fluorine. After the atomic fluorine has been produced, the atomic fluorine is mixed with deuterium and/or hydrogen in a laser cavity for producing a laser output.

Figure 1:
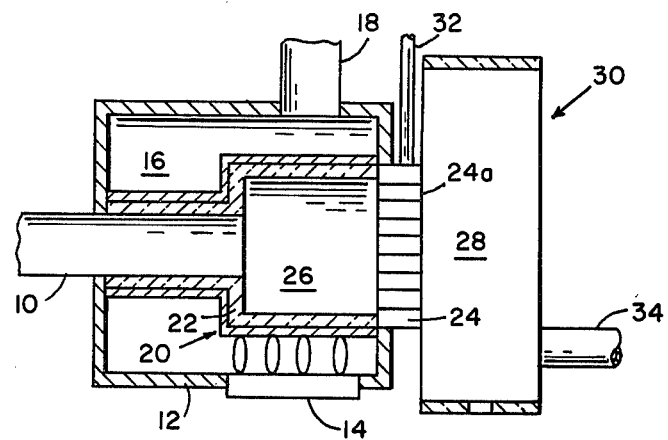
FIG. 1 is a schematic view of a device in accordance with this invention for carrying out the method.

Referring now to FIG. 1 of the drawing, one embodiment of this invention is disclosed which has a furnace type housing 12 that has a conventional hydrocarbon-/air burner 14 mounted therein with a chamber 16 and an exhaust outlet 18. An oven type device 20 with an inlet 10 is mounted in chamber 16 of housing 12 to be heated by the furnace. Also, oven 20 may be lined with a ceramic 22 due to the corrosive action of atomic fluorine. A laser nozzle injector 24 separates structurally and interconnects by flow passages between chamber 26 of oven 20 and chamber 28 of laser cavity 30. Inlet injector 32 is connected to a manifold and separate passage type arrangement within laser nozzle injector 24 for injecting deuterium and/or hydrogen to be mixed with atomic fluorine as both the atomic fluorine and deuterium and/or hydrogen are injected at face 24a into cavity 30 to provide a laser output in a conventional manner from laser cavity 30. Laser cavity 30 has an exhaust 34 for exhausting the expended gases from lasing chamber 28.

In operation, diatomic fluorine and/or nitrogen trifluoride and an inert gas such as helium or nitrogen is provided at inlet 10 and heated in chamber 26 by burner 14 to a temperature of about 1400° K. to 1600° K. to produce atomic fluorine. Oven 20 has ceramic lining 22 which can be made of materials such as $LaB_6$, $Al_2O_3$, MgO, or BeO. Ceramic liner 22 is used due to the corrosive action of the fluorine. The atomic fluorine is then passed through conventional nozzle 24 into chamber 28 at face 24a in which it is mixed with deuterium and/or hydrogen that is injected through injector 32 to chamber 28 at face 24a. The mixing of these gases in lasing chamber 28 causes a laser output to be produced and the expended gases are taken off at outlet 34. The laser output is taken off from chamber 28 in a conventional manner.

Figure 2:
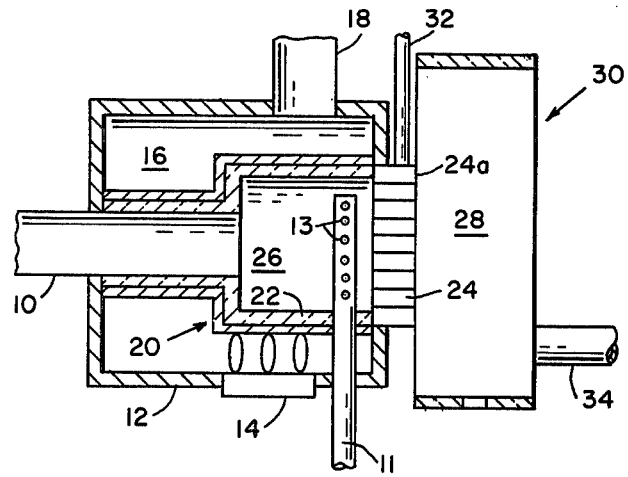
FIG. 2 is a schematic view of another embodiment in accordance with this invention.

Referring now to FIG. 2, like reference numerals in this application refer to the same elements as noted for FIG. 1. In this embodiment, furnace 20 may dispense with liner 22 (although illustrated with a liner) since the fluorine or nitrogen trifluoride is injected through inlet injector 11. This embodiment operates the same as that for FIG. 1 except helium and/or nitrogen enter at inlet 10 and are heated in oven 20 to mix with the fluorine or nitrogen trifluoride as they enter from inlet 11, exit though openings 13 into chamber 26 and thereby have the temperature of the diatomic fluorine or nitrogen trifluoride raised by the high temperature of the helium and/or nitrogen to produce atomic fluorine before being passed through inlet injector 24 into chamber 28. Then the atomic fluorine is mixed with hydrogen and/or deuterium that enter simultaneously with the atomic fluorine through inlet injector 32 into chamber 28 to produce a lasing mixture. In this embodiment also, the expended laser gas is exhausted through exhaust 34 and the laser output is taken off in a conventional manner.

Figure 3:
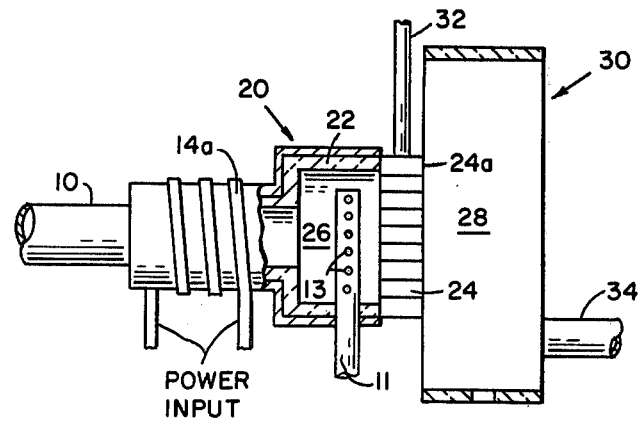
FIG. 3 is a schematic view of still another embodiment in accordance with this invention.

Referring now to FIG. 3, another embodiment of the invention is shown in which oven 20 is heated by an electrical resistance heating coil 14a (schematically illustrated) rather than by a hydrocarbon/air burner as in the embodiments of FIGS. 1 and 2. In this embodiment, inlet 10 can be used to introduce the fluorine or nitrogen trifluoride with helium and/or nitrogen as in the embodiment of FIG. 1 or the helium and nitrogen can enter through inlet 10 and the fluorine and nitrogen trifluoride can be entered through inlet 11 as in the embodiment of FIG. 2. Also, in this embodiment, like reference numerals refer to the same parts as illustrated and described in FIGS. 1 and 2.

In this embodiment, the fluorine and/or nitrogen trifluoride are heated in oven 20 by electrical resistance heater 14a to produce atomic fluorine or the helium or nitrogen are heated to a temperature that will heat the fluorine and/or nitrogen trifluoride entering at inlet 11 to produce atomic fluorine and then passing the atomic fluorine and other inert ingredients through injector 24 into chamber 28 where it is mixed with deuterium and/or hydrogen entering from inlet injector 32 to produce lasing of the gases to produce a laser output. The spent gases are expended through outlet 34.

In each of the embodiments set forth hereinabove, it can be clearly seen that deactivants are reduced to a mimimum due to the heating source used for producing the atomic fluorine being an external heat source that is applied and not from reactions within that produce deactivants such as in internal combustion arrangement. That is, such as, internal combustion that causes atomic fluorine and other deactivating products to be produced through exothermal decomposition and chemical reactions. Therefore, by using the apparatus and method set forth in this invention, the output of this type chemical laser can be increased by 40% or more.

We claim:

1. A low deactivation chemical laser device comprising an oven having a chamber therein that is lined with a ceramic material that resists the corrosive action of atomic fluorine and an inlet means to said chamber for the introduction of chemicals containing fluorine; a laser cavity having a chamber therein, an outlet for exhausting expended gases from said cavity, and laser output means; a laser nozzle injector fluidly interconnecting said chamber of said oven with said chamber of said laser cavity and an inlet injector connected into said laser nozzle injector for injecting deuterium and/or hydrogen to said chamber of said cavity; and an external heat source comprising a hydrocarbon/air burner type furnace disposed relative to said oven for heating said oven sufficiently to cause said fluorine to be converted to atomic fluorine, and whereby said atomic fluorine can pass through said laser nozzle injector into said laser cavity to mix with said deuterium and/or hydrogen to cause a lasing action and a laser output to be produced.

2. A low deactivation chemical laser device as set forth in claim 1, and further consisting of said ceramic material being selected from the group consisting of $LaB_6$, $Al_2O_3$, $MgO$ and $BeO$.

3. A low deactivation chemical laser device as set forth in claim 2, wherein said chemicals consist of diatomic fluorine and/or nitrogen trifluoride.

4. A low deactivation chemical laser device as set forth in claim 3, and wherein said chemicals further consist of inert gas selected from the group consisting of helium, nitrogen and mixtures thereof.

5. A low deactivation chemical laser device as set forth in claim 4, wherein said inert gas enters said oven through a first inlet of said inlet means and said diatomic fluorine and/or nitrogen trifluoride enter said oven through a second inlet of said inlet means.

6. A method for producing low deactivation chemical laser, said method consisting of directly heating chemicals containing fluorine with an external heat means to raise the temperature of the heated chemicals sufficient to produce atomic fluorine, directly passing the heated chemicals with the atomic fluorine through a laser nozzle injector into a laser cavity which includes laser output means, introducing gases selected from deuterium, hydrogen and a combination thereof into the laser cavity with said atomic fluorine to cause mixing in said cavity and lasing action to occur.

7. A method as set forth in claim 6, wherein said heated chemicals consist of laser gases selected from the group consisting of diatomic fluorine, nitrogen trifluoride and a combination thereof.

* * * * *